(12) United States Patent
Zhu et al.

(10) Patent No.: US 9,264,845 B2
(45) Date of Patent: Feb. 16, 2016

(54) SHARED CIRCUIT SWITCHED SECURITY CONTEXT

(75) Inventors: Xipeng Zhu, Beijing (CN); Wolfgang Granzow, Heroldsberg (DE)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 14/003,720

(22) PCT Filed: Apr. 6, 2011

(86) PCT No.: PCT/CN2011/072463
§ 371 (c)(1),
(2), (4) Date: Nov. 4, 2013

(87) PCT Pub. No.: WO2012/136001
PCT Pub. Date: Oct. 11, 2012

(65) Prior Publication Data
US 2014/0056222 A1    Feb. 27, 2014

(51) Int. Cl.
| H04W 4/00 | (2009.01) |
| H04W 60/00 | (2009.01) |
| H04W 4/20 | (2009.01) |

(52) U.S. Cl.
CPC ............... *H04W 4/005* (2013.01); *H04W 4/20* (2013.01); *H04W 60/00* (2013.01)

(58) Field of Classification Search
None
See application file for complete search history.

(56) References Cited

U.S. PATENT DOCUMENTS

| 2012/0252517 A1* | 10/2012 | Karampatsis et al. ........ 455/515 |
| 2012/0252518 A1* | 10/2012 | Karampatsis et al. ........ 455/515 |
| 2013/0078950 A1* | 3/2013 | Liao .............................. 455/411 |

FOREIGN PATENT DOCUMENTS

| EP | 2134101 A1 | 12/2009 |
| WO | WO-2012055572 A1 | 5/2012 |
| WO | WO-2012135514 A1 | 10/2012 |

OTHER PUBLICATIONS

3GPP TSG SA WG2 Meeting #83 TD S2-111040, "Update Key Issue/Solution MTC Device Trigger", Feb. 26, 2011, pp. 1-3.
Alcatel-Lucent,"Triggering MTC devices w/o SMS or long lasting NAT bindings", 3GPP TSG SA WG2 Meeting #83 TD S2-111235, Feb. 21, 2011,Salt Lake City, Utah, USA pp. 1-5.
International Search Report and Written Opinion—PCT/CN2011/072463—ISA/EPO—Dec. 22, 2011.
"3rd Generation Partnership Project;Technical Specification Group Services and System Aspects; Service requirements for Machine-Type Communications (MTC); Stage 1 (Release 11)",3GPP Standard; 3GPP TS 22.368, 3rdGeneration Partnership Project (3GPP), Mobile Competence Centre ; 650, Route Deslucioles ; F-06921 Sophia-Antipolis Cedex; France, No. V11.1.0, Apr. 1, 2011,pp. 1-23, XP050476757,[retrieved on Apr. 5, 2011].

(Continued)

*Primary Examiner* — Diane Lo
(74) *Attorney, Agent, or Firm* — Jimmy Cheng

(57) ABSTRACT

Certain aspects of the present disclosure provide a method for wireless communications. The method generally includes attempting, by a machine type communication (MTC) device, an attach procedure in order to detect a triggering request from an MTC server.

36 Claims, 5 Drawing Sheets

(56) References Cited

OTHER PUBLICATIONS

"3rd Generation Partnership Project;Technical Specification Group Services and System Aspects; System Improvements for Machine-Type Communications; (Release 11)",3GPP Standard; 3GPP TR 23.888, 3rdGeneration Partnership Project (3GPP), Mobile Competence Centre ; 650, Route Deslucioles ; F-06921 Sophia-Antipolis Cedex; France, No. V1.1.1, Apr. 5, 2011,pp. 1-94, XP050477126,[retrieved on Apr. 5, 2011].

Interdigital Communications: "Triggering a detached MTC device", 3GPP Draft; S2-110673 Triggering _A_Detached_Device_Disc, 3rd Generation Partnership Project (3GPP), Mobile Competence Centre ; 650, Route des Lucioles ; F-06921 Sophia-Antipollis Cedex; France, vol. SA WG2, no. Salt Lake City; 20110221, Feb. 15, 2011, pp. 1-4, XP050523859.

Supplementary European Search Report—EP11863109—Search Authority—Munich—Nov. 13, 2014.

* cited by examiner

SHARED CIRCUIT SWITCHED SECURITY CONTEXT

BACKGROUND

1. Field

Certain embodiments of the present disclosure generally relate to wireless communications and, more particularly, to a method and apparatus for triggering a detached machine type communication (MTC) device.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems and Orthogonal Frequency Division Multiple Access (OFDMA) systems.

A wireless communication network may include a number of base stations that can support communication for a number of wireless devices. Wireless devices comprise user equipments (UEs) and remote devices. A UE is a device that operates under direct control by humans. Some examples of UEs include cellular phones, smart phones, personal digital assistants (PDAs), wireless modems, handheld devices, laptop computers, netbooks, etc. A remote device is a device that operates without being directly controlled by humans. Some examples of remote devices include sensors, meters, location tags, etc. A remote device may communicate with a base station, another remote device, or some other entity. Machine type communication (MTC) refers to communication involving at least one remote device on at least one end of the communication.

SUMMARY

In an aspect of the disclosure, a method for wireless communications is provided. The method generally includes attempting an attach procedure in order to detect a triggering request from a machine type communication (MTC) server.

In an aspect of the disclosure, an apparatus for wireless communications is provided. The apparatus generally includes means for attempting an attach procedure in order to detect a triggering request from a machine type communication (MTC) server.

In an aspect of the disclosure, an apparatus for wireless communications is provided. The apparatus generally includes at least one processor and a memory coupled to the at least one processor. The at least one processor is generally configured to attempt an attach procedure in order to detect a triggering request from a machine type communication (MTC) server.

In an aspect of the disclosure, a computer-program product for wireless communications is provided. The computer-program product generally includes a computer-readable medium having code for attempting an attach procedure in order to detect a triggering request from a machine type communication (MTC) server.

In an aspect of the disclosure, a method for wireless communications is provided. The method generally includes receiving, from a machine type communication (MTC) device, an attach request to detect a triggering request.

In an aspect of the disclosure, an apparatus for wireless communications is provided. The apparatus generally includes means for receiving, from a machine type communication (MTC) device, an attach request to detect a triggering request.

In an aspect of the disclosure, an apparatus for wireless communications is provided. The apparatus generally includes at least one processor and a memory coupled to the at least one processor. The at least one processor is generally configured to receive, from a machine type communication (MTC) device, an attach request to detect a triggering request.

In an aspect of the disclosure, a computer-program product for wireless communications is provided. The computer-program product generally includes a computer-readable medium having code for receiving, from a machine type communication (MTC) device, an attach request to detect a triggering request.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
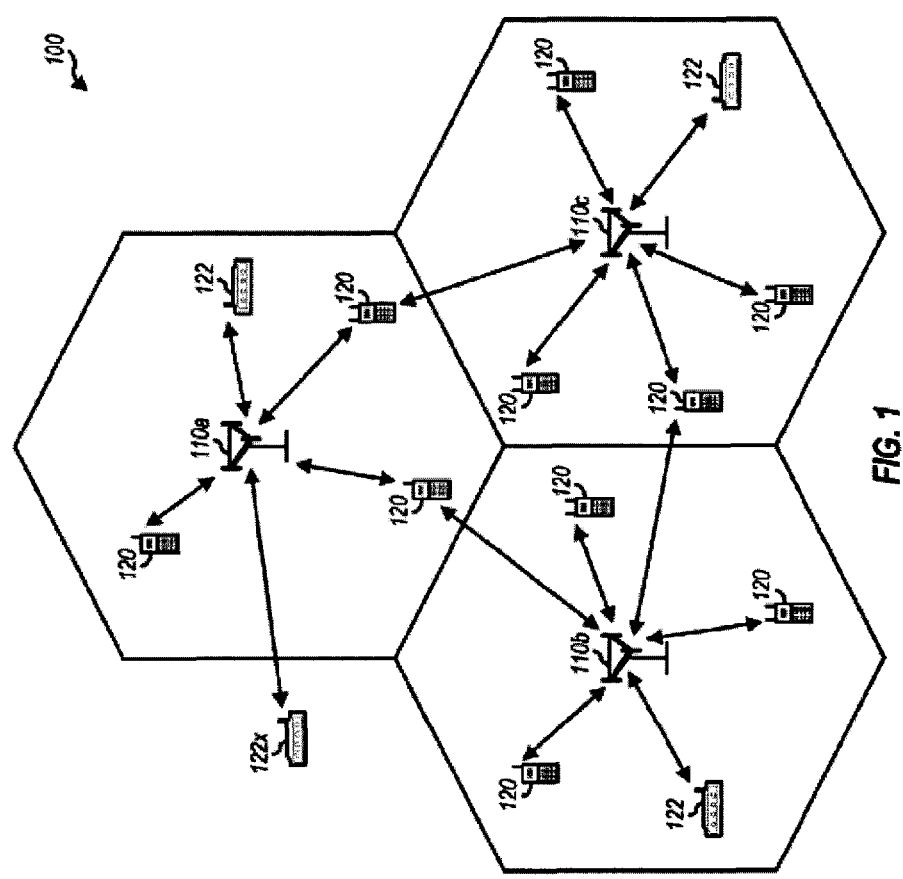
FIG. 1 illustrates an example wireless communication system in accordance with certain aspects of the present disclosure.

Various embodiments of the disclosure are described more fully hereinafter with reference to the accompanying drawings. This disclosure may, however, be embodied in many different forms and should not be construed as limited to any specific structure or function presented throughout this disclosure. Rather, these embodiments are provided so that this disclosure will be thorough and complete, and will fully convey the scope of the disclosure to those skilled in the art. Based on the teachings herein one skilled in the art should appreciate that the scope of the disclosure is intended to cover any embodiment of the disclosure disclosed herein, whether implemented independently of or combined with any other embodiment of the disclosure. For example, an apparatus may be implemented or a method may be practiced using any number of the embodiments set forth herein. In addition, the scope of the disclosure is intended to cover such an apparatus or method which is practiced using other structure, functionality, or structure and functionality in addition to or other than the various embodiments of the disclosure set forth herein. It should be understood that any embodiment of the disclosure disclosed herein may be embodied by one or more elements of a claim.

The word "exemplary" is used herein to mean "serving as an example, instance, or illustration." Any embodiment described herein as "exemplary" is not necessarily to be construed as preferred or advantageous over other embodiments.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses or objectives. Rather, embodiments of the disclosure are intended to be broadly applicable to different wireless technologies, system configurations, networks and transmission protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as Node B, Radio Network Controller ("RNC"), evolved Node B ("eNB"), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station, a remote station, a remote terminal, a remote device, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more embodiments taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some embodiments, the node is a wireless node. Such wireless node may provide, for example, connectivity for or to a network (e.g., a wide area network such as the Internet or a cellular network) via a wired or wireless communication link.

In one embodiment of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH) and Broadband Pilot Channel (BPICH).

Method and Apparatus for Triggering a Detached Machine Type Communication Device Machine type communication (MTC) devices, which may infrequently transmit data, and may be delay tolerant, may stay in a detached state when there is no data transmission. Triggering a detached MTC device to establish communication with an MTC server is a requirement of 3GPP system enhancement for MTC. For some embodiments, the MTC server may trigger an MTC device which is offline. However, no information may be available in a network for a detached MTC device. Therefore, the MTC server may not be able to trigger the detached MTC device. For some embodiments, the MTC device may attempt an attach procedure with the MTC server in order to detect the triggering request.

FIG. 1 shows a wireless communication network 100, which may be an LTE network or some other wireless network. Wireless network 100 may include a number of base stations 110 and other network entities. Each base station 110 may provide communication coverage for a particular geographic area and may support communication for wireless devices located within the coverage area. To improve system capacity, the overall coverage area of a base station may be partitioned into multiple (e.g., three) smaller areas. Each smaller area may be served by a respective base station subsystem. In 3GPP, the term "cell" can refer to the smallest coverage area of a base station and/or a base station subsystem serving this coverage area. A base station may support one or multiple (e.g., three) cells.

A number of wireless devices may be dispersed throughout the wireless network, and these wireless devices may comprise UEs 120 and remote devices 122 (e.g., MTC devices). A remote device may also be referred to as a machine or an unmanned device. A wireless device may be stationary or mobile and may communicate with a base station via the downlink and/or uplink. The downlink (or forward link) refers to the communication link from the base station to the wireless device, and the uplink (or reverse link) refers to the communication link from the wireless device to the base station.

For some embodiments, an MTC device may attempt an attach procedure with a device triggering check indicator to check whether an MTC server requested communication (e.g., send a triggering request) with the MTC device. If the MTC server did not request communication, the MME/SGSN (mobility management entity/serving GPRS support node) may reject the attach procedure. Otherwise, the MME/SGSN may accept the attach procedure. If the MME/SGSN does not support this enhancement to the attach procedure, the MME/SGSN may accept the attach procedure, and the MTC device may contact the MTC Server via a user plane to check whether or not the MTC server has requested communication with the MTC device. There may be an impact to the non-access stratum (NAS) layer (e.g., additions to the existing attach procedure).

Figure 2:
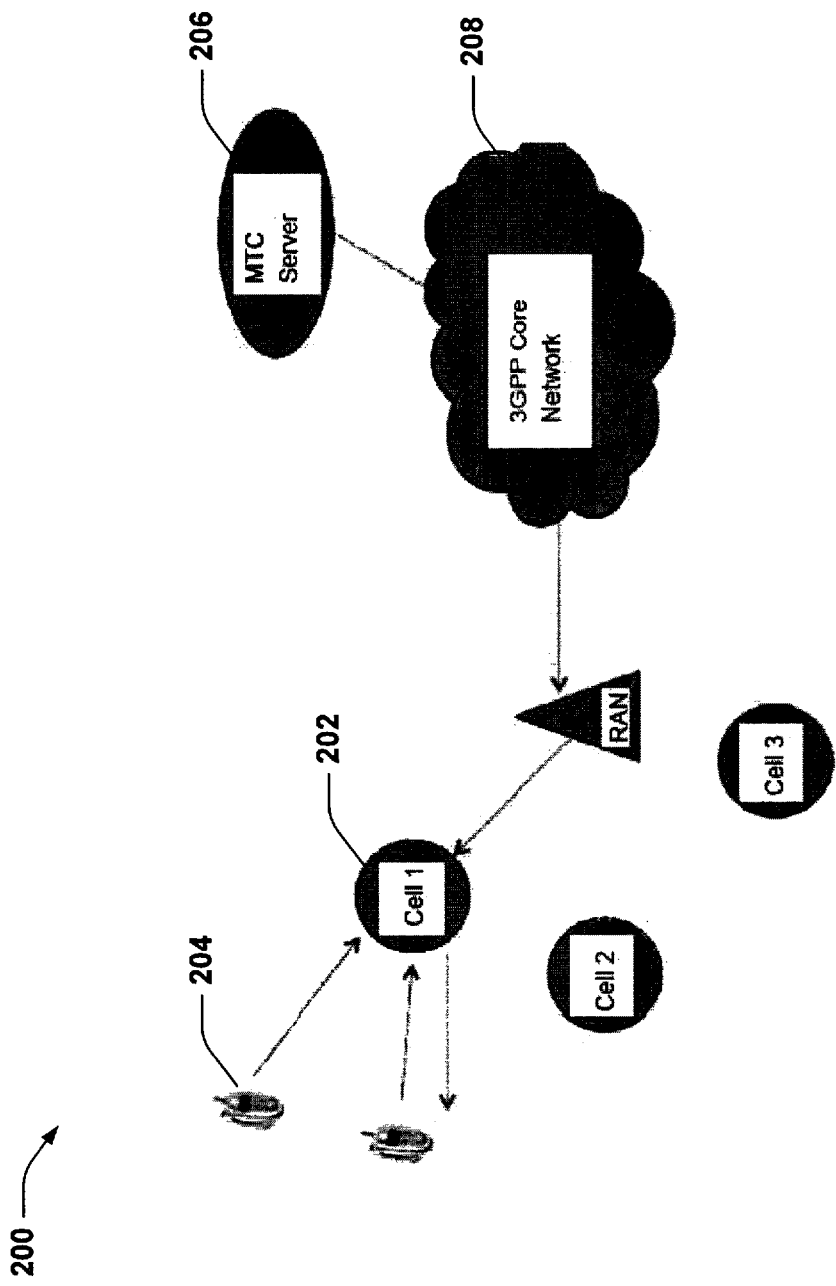
FIG. 2 illustrates a network comprising a number of cells and machine type communication (MTC) devices in accordance with certain aspects of the present disclosure

FIG. 2 illustrates a wireless communication network 200 comprising a number of cells 202 and MTC devices 204 (e.g., remote devices 122), in accordance with certain aspects of the present disclosure. For some embodiments, the network 200 may be 3GPP system. An MTC server 206 may send a triggering request to the 3GPP core network (e.g., the GGSN/P-GW, the PRRF, or the HSS). An MTC device 204 may attempt an attach procedure in order to detect the triggering request from the MTC server 206, as will be discussed further herein. For some embodiments, an explicit trigger on a paging or broadcast channel may not be required to check for a device triggering request.

Figure 3:
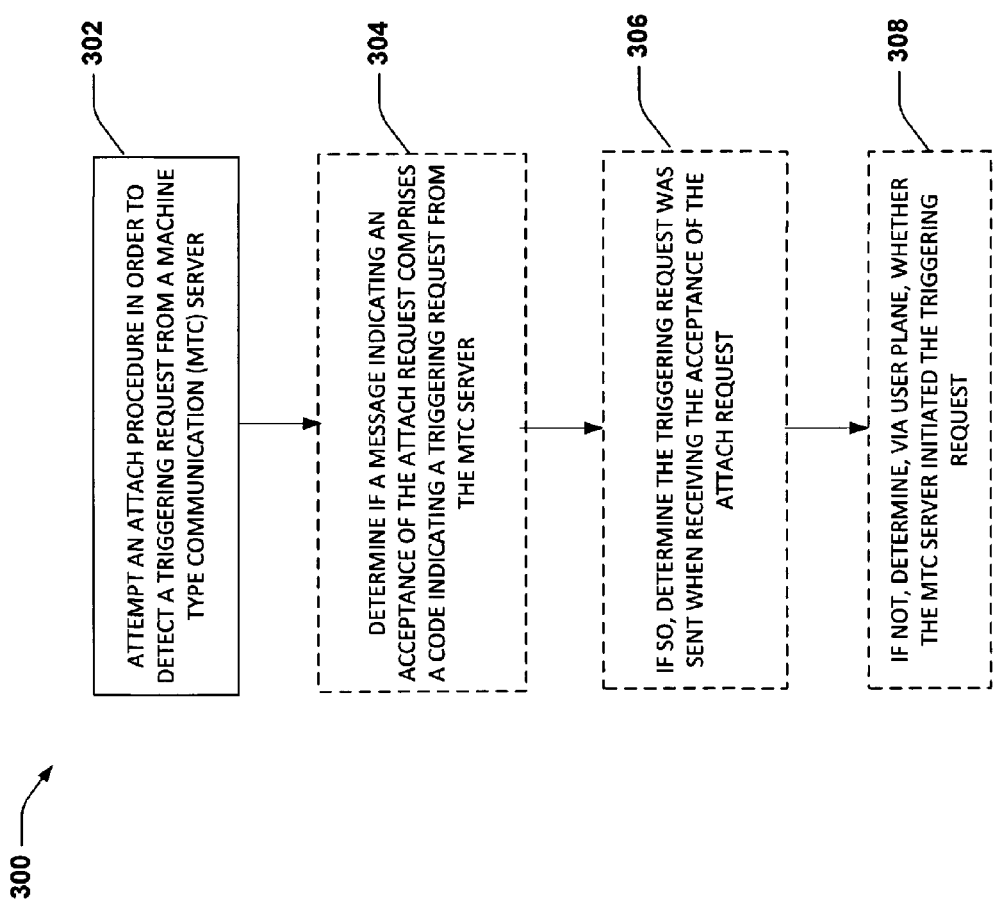
FIG. 3 illustrates example operations for detecting a triggering request from an MTC server, in accordance with certain aspects of the present disclosure.

FIG. 3 illustrates example operations 300 in accordance with certain aspects of the present disclosure. The operations 300 may be performed from, for example, the perspective of an MTC device to detect a triggering request from an MTC server. At 302, the MTC device may attempt an attach procedure in order to detect a triggering request from the MTC server. For some embodiments, attempting the attach procedure may comprise sending an evolved packet system (EPS) or a general packet radio service (GPRS) attach request indicating a detecting triggering request indicator or a cause value.

At 304, the MTC device may determine if a message indicating an acceptance of the attach request comprises a code indicating a triggering request from the MTC server (control plane solution). If so, the MTC device may determine the triggering request was sent when receiving the acceptance of the attach request, at 306. Therefore, the MTC device may attempt an attach procedure with a special cause value that indicates to the network that the attach attempt is due to checking for device triggers. The network may then reject the access attempt if no such trigger is available.

However, if the message does not comprise a code indicating a triggering request from the MTC server, the MTC device may determine, via a user plane, whether the MTC server initiated the triggering request, at 308 (user plane solution). In other words, after completion of the attach procedure, the MTC device may check with the MTC server for a triggering request via user plane. The user plane solution may be suitable for MTC devices using legacy radio modems, or when a mobile operator may not want to provide special functionality in a core network for support of device triggering.

For some embodiments, the MTC device may determine a triggering request was not sent when receiving a rejection of the attach request. A message indicating the rejection may comprise a code indicating the rejection was due to absence of a triggering request.

For some embodiments, the MTC device may receive one or more parameters indicating when to attempt the attach procedure. The one or more parameters may indicate a periodic schedule to attempt the attach procedure. The MTC server may configure the MTC device with the frequency and times of the periodic attach procedures. In other words, the MTC device may attempt the attach procedures at certain pre-defined time periods. Network operators may pre-define/alter the time period based on criteria (e.g., daily traffic load) and only allow MTC devices to access the network (e.g., attempt attach procedures) during the pre-defined time period. Periodic attach procedures may be efficient when the time periods are rather long (e.g., once per day) such that the signaling load due to the attach procedure may be negligible. The periodic attach procedures may perform efficiently for any level of mobility of the MTC device, wherein the MTC device may not have to remain in a fixed location.

Figure 4:
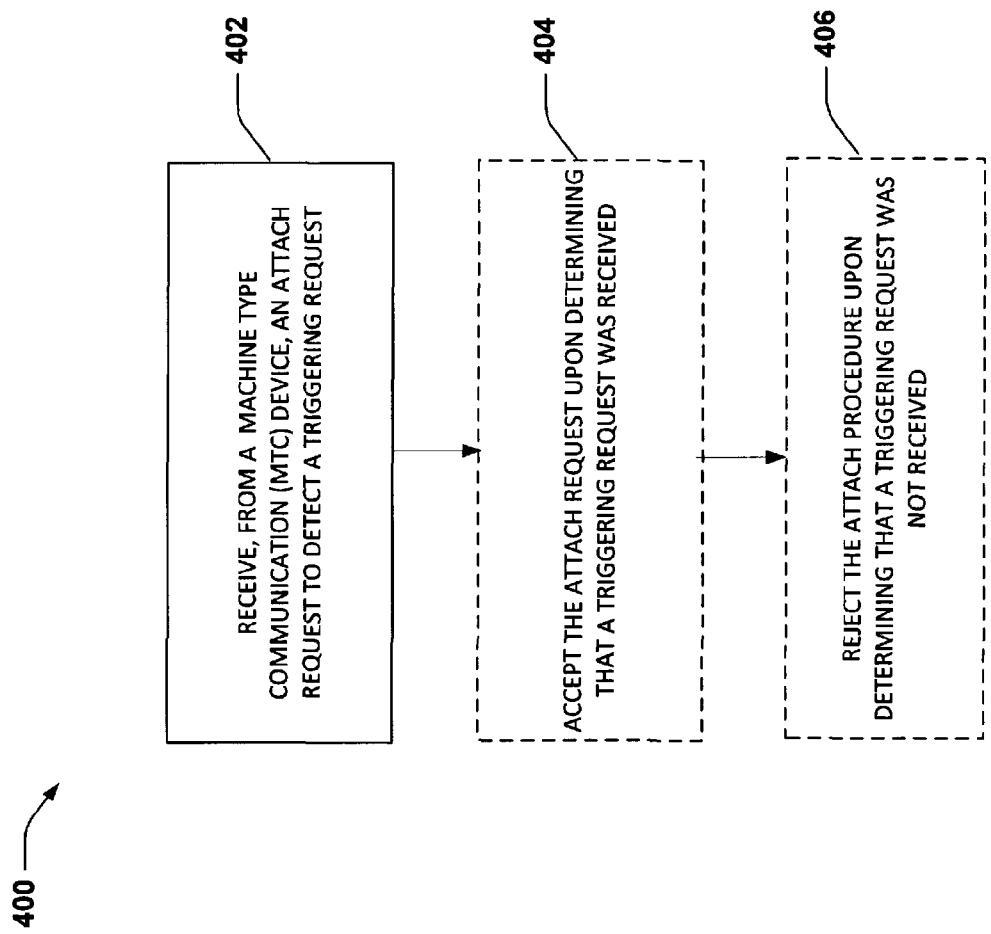
FIG. 4 illustrates example operations for either accepting or rejecting an attach request from an MTC device, in accordance with certain aspects of the present disclosure.

FIG. 4 illustrates example operations 400 in accordance with certain aspects of the present disclosure. The operations 400 may be performed from, for example, the perspective of base station (BS) to either accept or reject an attach request from an MTC device. At 402, the BS may receive, from the MTC device, an attach request to detect a triggering request from an MTC server. At 404, the BS may accept the attach request upon determining that a triggering request was received. For some embodiments, a message indicating the acceptance may comprise a code indicating a triggering request from the MTC server. At 406, the BS may reject the attach procedure upon determining that a triggering request was not received. For some embodiments, a message indicating the rejection may comprise a code indicating the rejection was due to absence of a triggering request.

Figure 5:
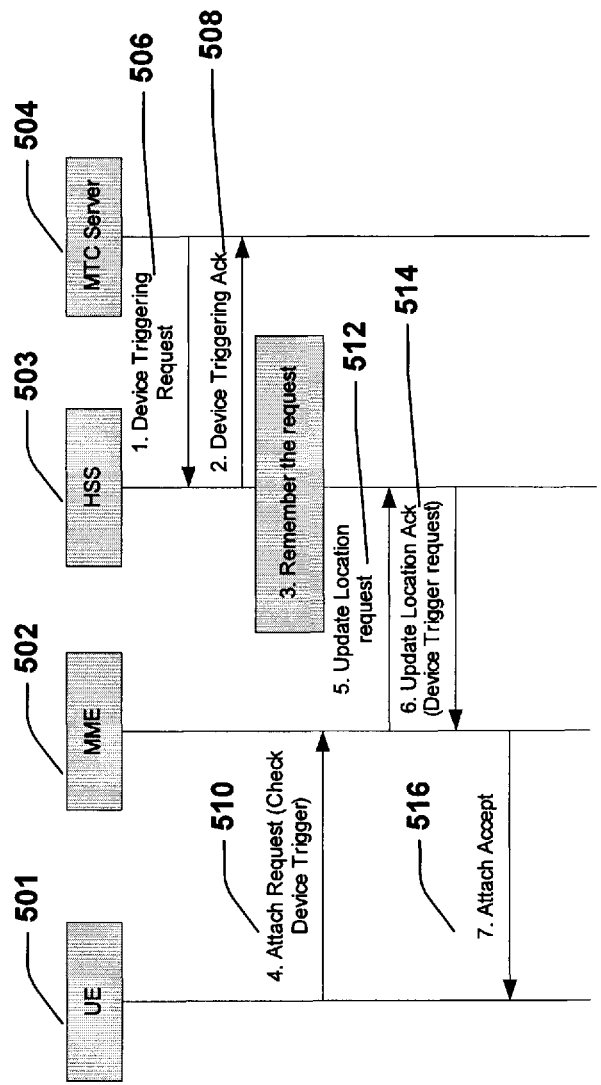
FIG. 5 illustrates an attach procedure performed by an MTC device in order to detect a triggering request from an MTC server, in accordance with certain aspects of the present disclosure.

FIG. 5 illustrates an attach procedure performed by an MTC device 501 in order to detect a triggering request from an MTC server 504, in accordance with certain aspects of the present disclosure. At 506, the MTC server 504 may send a triggering request to a home subscriber server (HSS) 503. At 508, the HSS 503 may acknowledge the triggering request. For some embodiments, the HSS 503 may store the request in subscriber data. If the MTC device 501 has an associated MME/SGSN, the MME/SGSN may be notified for the triggering request (e.g., by Insert Subscriber Data procedure).

At 510, the MTC device 501 may initiate an attach procedure with a detecting triggering request indicator per MTC service previously assigned periodic attach timer or a next attach time. At 512, the mobility management entity (MME) 502 may send an update location request to the HSS 503. At 514, the HSS 503 may send subscriber data with the device triggering request indicator to the MME 502. In the control plane solution, if a device triggering request indicator was received at 512, the MME 502 may accept the attach request at 516. Otherwise, the MME 502 may reject the attach request with an appropriate reason code. In the user plane solution, if the MME 502 does not support the device triggering function, the MME 502 may accept the attach request as in normal UE attach procedures. The MTC device 501 may then check from a user plane for a triggering request from the MTC server 504.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the embodiments disclosed herein may be implemented as electronic hardware, computer software or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, a phrase referring to "at least one of" a list of items refers to any combination of those items, including single members. As an example, "at least one of: a, b, or c" is intended to cover: a, b, c, a-b, a-c, b-c, and a-b-c.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for wireless communications, comprising:
   attempting an attach procedure from a machine type communication (MTC) device, wherein the attach procedure comprises sending an attach request with an indication the attach request is for detecting a triggering request; and
   receiving a message in response to the attach request from a machine type communication (MTC) server.

2. The method of claim 1, wherein the attach procedure comprises an evolved packet system (EPS) attach procedure or a general packet radio service (GPRS) attach procedure.

3. The method of claim 1, wherein the received message indicates an acceptance of the attach request and further comprising:
   determining if the received message comprises an indication of a triggering request from the MTC server;
   if so, determining the triggering request was sent; and
   if not, checking whether the MTC server initiated the triggering request.

4. The method of claim 1, further comprising:
   determining a triggering request was not sent when the received message is a rejection of the attach request.

5. The method of claim 4, wherein the received message indicates a rejection of the attach request, and wherein the received message comprises a code indicating the rejection is due to absence of a triggering request.

6. The method of claim 1, further comprising:
   receiving one or more parameters indicating when to attempt the attach procedure.

7. The method of claim 6, wherein the one or more parameters indicate a periodic schedule to attempt the attach procedure.

8. An apparatus for wireless communications, comprising:
   means for attempting an attach procedure from a machine type communication (MTC) device, wherein the attach procedure comprises sending an attach request with an indication the attach request is for detecting a triggering request; and
   means for receiving a message in response to the attach request from a machine type communication (MTC) server.

9. The apparatus of claim 8, wherein the attach procedure comprises an evolved packet system (EPS) attach procedure or a general packet radio service (OPRS) attach procedure.

10. The apparatus of claim 8, wherein the received message indicates an acceptance of the attach request and further comprising:
    means for determining if the received message comprises a code indicating a triggering request from the MTC server;
    means for determining, if the received message does comprise a code indicating a triggering request from the MTC server, the triggering request was sent when receiving the acceptance of the attach request; and
    means for checking, if the received message does not comprise a code indicating a triggering request from the MTC server, whether the MTC server initiated a triggering request.

11. The apparatus of claim 8, further comprising:
    means for determining a triggering request was not sent when the received message is a rejection of the attach request.

12. The apparatus of claim 11, wherein the received message indicates a rejection of the attach request, and wherein the received message comprises a code indicating the rejection is due to absence of a triggering request.

13. The apparatus of claim 8, further comprising:
    means for receiving one or more parameters indicating when to attempt the attach procedure.

14. The apparatus of claim 13, wherein the one or more parameters indicate a periodic schedule to attempt the attach procedure.

15. An apparatus for wireless communications, comprising:
    at least one processor configured to:
       attempt an attach procedure from a machine type communication (MTC) device, wherein the attach procedure comprises sending an attach request with an indication the attach request is for detecting a triggering request;
       receive a message in response to the attach request from a machine type communication (MTC) server; and
    a memory coupled with the at least one processor.

16. A non-transitory computer-readable medium comprising code for:
    attempting an attach procedure from a machine type communication (MTC) device, wherein the attach procedure comprises sending an attach request with an indication the attach request is for detecting a triggering request; and
    receiving a message in response to the attach request from a machine type communication (MTC) server.

17. A method for wireless communications, comprising:
    receiving, from a machine type communication (MTC) device, an attach request to detect a triggering request, the attach request having an indication the attach request is for detecting a triggering request; and
    transmitting a message in response to the attach request.

18. The method of claim 17, wherein the attach request comprises a detecting triggering request indicator or a cause value.

19. The method of claim 17, wherein the attach request comprises an evolved packet system (EPS) attach request or a general packet radio service (GPRS) attach request.

20. The method of claim 17, further comprising:
    accepting the attach request upon determining that a triggering request was received.

21. The method of claim 20, wherein the transmitted message indicates acceptance of the attach request and comprises a code indicating a triggering request from a machine type communications (MTC) server.

22. The method of claim 17, wherein the transmitted message indicates a rejection of the attach procedure when a triggering request was not received.

23. The method of claim 22, wherein the transmitted message comprises a code indicating the rejection was due to absence of a triggering request.

24. The method of claim 17, further comprising:
transmitting one or more parameters indicating to the MTC device when to attempt the attach request to detect the triggering request.

25. The method of claim 24, wherein the one or more parameters indicate a periodic schedule to the MTC device for attempting the attach request to detect the triggering request.

26. An apparatus for wireless communications, comprising:
means for receiving, from a machine type communication (MTC) device, an attach request to detect a triggering request, the attach request having an indication the attach request is for detecting a triggering request; and
means for transmitting a message in response to the attach request.

27. The apparatus of claim 26, wherein the attach request comprises a detecting triggering request indicator or a cause value.

28. The apparatus of claim 26, wherein the attach request comprises an evolved packet system (EPS) attach request or a general packet radio service (GPRS) attach request.

29. The apparatus of claim 26, further comprising:
means for accepting the attach request upon determining that a triggering request was received.

30. The apparatus of claim 29, wherein the transmitted message indicates acceptance of the attach request and comprises a code indicating a triggering request from a machine type communications (MTC) server.

31. The apparatus of claim 26, further comprising:
means for rejecting the attach procedure upon determining that a triggering request was not received.

32. The apparatus of claim 31, wherein the transmitted message indicates a rejection of the attach request and the transmitted message comprises a code indicating the rejection was due to absence of a triggering request.

33. The apparatus of claim 26, further comprising:
means for transmitting one or more parameters indicating to the MTC device when to attempt the attach request to detect the triggering request.

34. The apparatus of claim 33, wherein the one or more parameters indicate a periodic schedule to the MTC device for attempting the attach request to detect the triggering request.

35. An apparatus for wireless communications, comprising:
at least one processor configured to:
receive, from a machine type communication (MTC) device, an attach request to detect a triggering request, the attach request having an indication the attach request is for detecting a triggering request; and
transmit a message in response to the attach request; and
a memory coupled with the at least one processor.

36. A non-transitory computer-readable medium comprising code for:
receiving, from a machine type communication (MTC) device, an attach request to detect a triggering request, the attach request having an indication the attach request is for detecting a triggering request, and
transmitting a message in response to the attach request.

* * * * *